Patented May 26, 1931

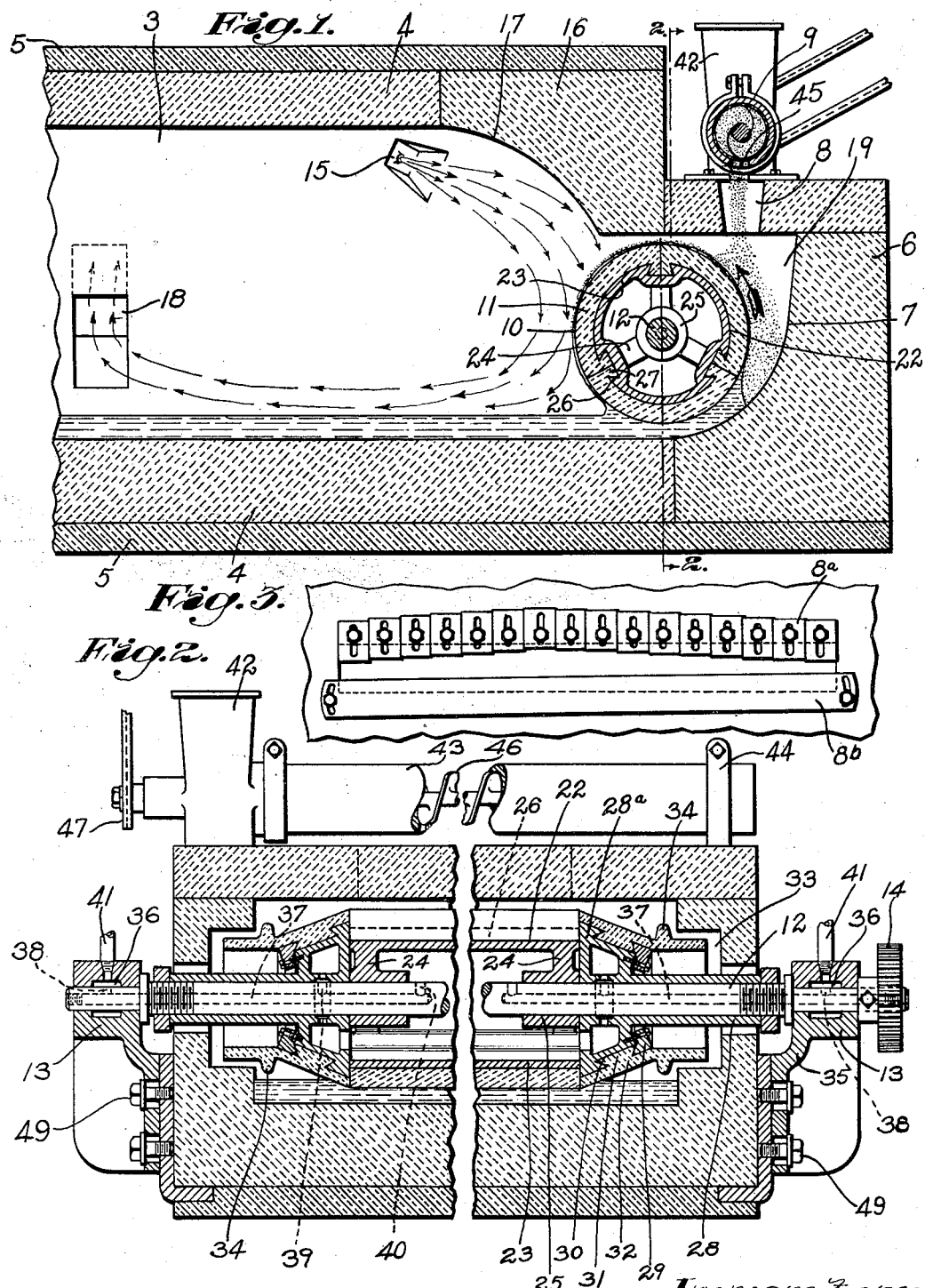

1,807,054

UNITED STATES PATENT OFFICE

HAROLD A. WADMAN, OF HARTFORD, CONNECTICUT, ASSIGNOR TO HARTFORD-EMPIRE COMPANY, OF HARTFORD, CONNECTICUT, A CORPORATION OF DELAWARE

METHODS OF AND APPARATUS FOR MAKING GLASS

Application filed November 17, 1928. Serial No. 320,086.

My invention relates to apparatus and methods for continuously producing glass from glass batch.

The principal object of the invention is to provide a method and means whereby glass batch may be fed continuously in relatively small quantities over a relatively large melting area, so that a thin layer of batch may be continuously presented to the heat of the furnace, whereby rapid and uniform continuous melting may be obtained. A further object of the invention is to provide a moving melting surface for the batch fed into the furnace which presents the same to the flames in the form of a thin layer, in controllable amounts and at a controlled rate.

A further object of the invention is to provide the moving melting surface with suitable mechanism for moving the same and with means for suitably cooling the operating parts.

Further objects will be apparent from a reading of the subjoined specification and claims.

Heretofore it has been the usual practice in making glass to maintain a relatively large deep bath of melted glass onto which relatively large amounts of new glass making batch are periodically fed, the periods between feeds being often as much as thirty minutes and the amount of batch fed on each occasion being as much as several hundred pounds. The old method of feeding batch results in the creation of a succession of floating islands of batch each of which is partially submerged in the already melted glass. A large proportion of the batch of these islands is shielded from the heating and melting action of the flames and from the radiation of the crown of the furnace. It often happens that portions of the batch are not melted in the melting zone of the furnace or until they are carried into other portions of the furnace, where other glass making operations, such as refining, are carried on. The old practice presents numerous difficulties often resulting in serious faults in the finished glass.

The present invention, in providing the continuously feeding relatively small quantities of batch and promptly reducing this batch while spread in a thin layer upon the melting surface, obviates or minimizes the difficulties heretofore experienced in the use of the prior methods.

One embodiment of the mechanical features of my invention is illustrated in the accompanying drawings, in which Figure 1 is a vertical sectional view taken on the longitudinal center line of the melting end of a glass melting furnace;

Fig. 2 is a view partially in section and partly in elevation taken on the line 2—2 of Fig. 1.

Fig. 3 is a plan view of a detail of the feeding opening.

Generally, this embodiment comprises a melting compartment in the rear end of which is mounted a suitably constructed rotary drum having a refractory surface. The walls of the compartment are so formed that a chamber practically shielded from the currents of the combustion gases is formed rearwardly of the axis of the drum. Into this chamber and onto the drum a continuous thin curtain of raw batch is fed through a suitable opening in the top of the compartment by any suitable continuous feeding device as, for instance, a screw conveyor provided with an extended slot through which the material carried by the screw may be dropped vertically through the opening in the furnace. Preferably the curtain of batch strikes upon the refractory surface of the drum, which surface, during a previous portion of the revolution of the drum, has become coated with a thin coating of melted glass to which the new batch adheres. The batch may, if desired, be deposited in a continuously renewed pile, a surface of which is maintained in contact with the drum and from which the drum may pick up a suitable coating of batch.

In the melting compartment and forwardly of the axis of the drum suitable heating means are provided for directing a flame against the surfaces of the drum as the successive portions thereof are brought to the forward position. More specifically, this means comprises gas or oil burners placed in the walls of the compartment substantially as shown in Fig. 1 and arranged so that the flames projected therefrom release the maximum heating energy directly at the drum to rapidly melt the batch adhering thereto. The glass so made runs downwardly into the bath. The flames and the products of combustion after passing over the forward face of the drum are caused to move forwardly in the tank scrubbing the surface of the glass contained therein, and are withdrawn by suitable draft means into a recuperator. The upper rearward portion of the tank is so formed as to aid in guiding the flames and products of combustion in the desired curved path as shown in the drawings.

The drum is mounted in suitable bearings outside of the furnace and has certain peculiarities of construction including special ways in which the refractory blocks may be fastened to the metal framework of the drum and suitable arrangements for cooling the metal parts, including the bearings to offset the destructive effect of the intense heat in the furnace upon these parts.

The drum and the batch feeding means are preferably driven through means which permit the individual regulation of their speeds, and hence the selection and maintenance of the desired relative operations of these parts. They may thus be driven from separate variable speed motors or from a single motor through suitable speed changing mechanisms, such as the well-known Reeve drive speed regulators.

By the arrangement shown, my novel method of feeding and melting glass batch may readily be accomplished. The method is not necessarily limited, however, to the particular structure shown, but may be accomplished by a plurality of other instrumentalities. For instance, the drum here shown as revolving upon a horizontal axis may be supplanted by a disk revolving on a vertical axis or an axis slightly tilted from the vertical, in which event suitable curtaining means separating the initial batch receiving chamber and the forward portions of the tank may be employed.

Referring more specifically to the drawings, 3 represents the melting end of a glass furnace embodying my invention having the usual bottom, side and top walls 4 of refractory material. These walls may be made of the usual refractory blocks, now in common use, or may preferably be made of refractories of higher quality, as for example, those disclosed in the patent to Paul G. Willetts, No. 1,605,885, in which latter event or in any case in which the refractories are of sufficiently high quality, they may be suitably insulated by any suitable insulating material indicated at 5 in Fig. 1. The tank 3 is provided with a rearward extension 6 preferably of less height than the remainder of the tank and providing a rear closure for the structure having preferably a sloping inner surface 7. The top of this extension is provided with a suitable opening or slot 8 extending substantially across the width of the tank through which batch may be fed continuously by any suitable continuous batch feeding device, as that illustrated at 9 in Fig. 1.

The effective character of the slot 8 may be varied by mans of the plates $8^a$ and/or the plate $8^b$ mounted, as shown in Fig. 3, to permit various obvious adjustments. These means permit the deposit of batch on the drum to be varied throughout the several portions of the drum.

A suitable drum 10 having an outer refractory surface 11 is fast to a shaft 12 which is mounted in suitable bearings 13, and extends transversely of the rearward end of the melting compartment. The drum is preferably of such size as to nearly fill the space between the surface level of the melted glass in the furnace and the upper wall of the extension 6 of the furnace and is so mounted that in operation it dips, to a slight extent, in the molten bath and clears the top wall of the extension only sufficiently to prevent contact of melted glass or batch adhering to its surface with the top of the extension. Thus the drum itself forms an effective shield to the currents of combustion gases and prevents them from entering the compartment 19 of the extension. Because of this arrangement, the batch may be fed downwardly in a thin continuous curtain and will fall directly upon the surface of the drum, without the loss of its finer constituents through the effects of combustion currents in the tank. The drum is rotated at suitable speeds in the direction indicated (Fig. 1) from any suitable source of power, through the pinion 14 mounted on the shaft 12. As the drum rotates, the successive portions of its surface dip into the already melted glass and then move into the confined chamber 19 while a thin layer of glass still adheres thereto. As each portion passes through this chamber, the batch adheres thereto, forming a thin film or layer of batch uniformly over the surface of the drum. The further rotation of the drum carries the successive portions of the surface into the zone of melting heat where the batch is melted. The glass so made runs off of the drum into the bath of glass maintained in the tank. As stated, the drum may be driven from the same motor as the feeding device or from a separate motor. In either case, the arrangement should be such as to permit adjustment of the relative rates of feed and rotation of the drum.

By the proper regulation of the speeds of operation of the feeding device and the drum and of the temperature developed by the burners, the apparatus shown may be operated to melt glass continuously at the desired rate, which rate may vary within wide limits.

Thus, my invention assures the continuous production of glass at precisely the rate demanded for the glassware fabricating operations. It is thus especially adapted for use in furnaces of small dimensions, designed to avoid the maintenance of large baths of glass.

The means for heating the furnace and melting the glass may be of any suitable type, designed to present an intense heat to the surface of the drum. The heating means comprises one or more gas or oil burners 15 piercing the side walls or crown of the melting compartment and directed at an angle to the horizontal to project flame directly upon the revolving drum. Preferably, the blocks 16, forming the upper portion of the melting end immediately rearwardly of the burners 15, are provided, internally of the compartment, with a downwardly curving surface 17 which aids in directing the flame of the burners upon the drum. The flame of the burners after playing upon the forward surface of the drum are drawn forwardly in the melting compartment, over the surface of the already melted glass and out through suitable draft openings 18 in the sides of the compartment.

The preferred form of drum illustrated in the drawings comprises an interior frame of metal covered by an exterior portion of refractory material. The drum is divided longitudinally into three general sections (see Fig. 2). The central section designated, as a whole, as 22 is built up of a metallic cylindrical member 23 having inwardly projecting spiders 24 which carry hubs 25 fastened to the shaft 12. The outer surface of the member 23 is provided with longitudinal grooves 26 adapted to receive dove-tailed ribs 27 of the refractory blocks 11. These ribs may be formed in part on each of two adjacent blocks 11 and by this means, not only are the blocks held firmly to the cylinder, but a proper joint between the blocks is secured.

The two outer sections of the drum 10 are substantially alike (see Fig. 2). Each of these sections comprises a sleeve 28 surrounding and rotating with the shaft 12. The inner ends of the sleeves 28 carry hollow metallic frames 28ª integral with the sleeves and formed generally as truncated cones, the interiors of which are in communication with the interior of the cylinder 23. The outer end of each cone 28ª carries removable metallic clamps 29 adapted to coact with the outer surface of the cone to form a peripheral groove 30 for the reception of dove-tailed tongues 31 of the blocks 32 which form a refractory outer surface of these portions of the drum. As shown in Fig. 2, the blocks 32 are so formed as to follow the truncated cone-shaped frame 28ª from the point at which they contact with the blocks 11 of the central section to a point beyond the clamps 29. The blocks then parallel from the shaft to form a cylindrical heat guard about the shaft 12 and the sleeve. The cylindrical guards so formed extend into recesses 33 in the side walls of the tank and carry, intermediate of their ends, projections which form rings 34 of greater diameter than the recesses. These projections are so formed as to prevent the passage of molten glass to and beyond the recesses and to facilitate the discharge of glass into the bath in the furnace.

The shaft 12 is mounted in bearings 13 which are suitably mounted outside of the tank. As illustrated (Fig. 2) the bearings are carried by adjustable brackets 35 by means of which the bearings may be suitably adjusted, particularly in the vertical direction, whereby the extent of dip of the cylinder in the bath may be varied. Each bearing 13 is in effect a double bearing, being formed with a water chamber 36 between the actual bearing surfaces. The shaft 12 is provided with longitudinal bores 37 extending from its ends toward the center of the drum. Each bore 37 is in communication through a bore 38 with the water chamber 36 of the bearing at that end of the shaft from which the bore is started. Each bore 37 is in communication with the interior of the adjacent frame 28ª through a bore 39 and each bore 37 is also in communication with the interior of the central section 22 of the drum through bore 40. The cooling fluid may be admitted to either chamber 36 through an associated pipe 41 from any suitable source (not shown) and after passing through the interior of the drum may be discharged through the other chamber 36 and its pipe 41. Thus the direction of movement of the cooling fluid may be varied as described.

If desired the structure of the brackets 35 may be varied to provide a running adjustment of the cylinder or drum 10 by substituting slides and associated jack screws for the screws 49 and by replacing the pinion drive by a sprocket and chain drive.

In the embodiment illustrated, the outer surface of the drum is shown as composed of refractory material. This is my preferred construction, but I may also use a drum composed entirely of metal and having a metallic outer surface onto which the batch is fed and by which it is conveyed to the melting zone.

The means for feeding batch to the tank may, as stated, be of any suitable type which is adapted to continuously feed batch in a curtain through the opening 8 upon the drum 10. As here shown, it comprises a hopper 42 which opens downwardly into a cylindrical casing 43, which casing is carried by support 44 upon the rearward extension 6 of the melting chamber. The casing 43 provides an enclosure for screw conveyor 46 which is continuously driven through the sprocket 47 from any suitable source of power. The casing 43 is provided with a suitable longitudinal slot 45 registering with the opening 8. Preferably the end of the cylinder away from the hopper 42 is not closed, but the supply, size of parts, and speed of operation is adjustable so that the supply carried by the screw conveyor is exhausted immediately before it passes the outer end of the slot in the casing 43. If the outer end of the casing is closed, it should be closed by a removable cap which would permit ready correction of any clogging which might result from an inaccurate selection of the factors of feed, speed and opening in the batch feeder.

It is thus aparent that my novel apparatus and method provides for the accomplishment of the objects heretofore set out. Its use is advantageous in making glass not only for the manufacture of bottles and hollow ware, but also in the manufacture of sheet and plate glass. In the manufacture of sheet and plate glass, it is desirable to maintain a relatively wide pool of glass in homogeneous condition from which the sheet may be drawn or rolled. It is desirable therefore to maintain a uniformity of feed of batch across a wide section of the tank and uniform melting treatment of the batch so fed. This facilitates the formation and movement of a relatively wide stream of glass to the place from which the sheet is drawn or delivered.

It is obvious that modifications both in method and apparatus may be resorted to without departing from the spirit of my invention as expressed in the appended claims.

I claim:

1. The method of feeding and melting glass batch which comprises continuously feeding batch into a closed melting chamber, causing the batch to adhere to a moving surface located in the chamber, continuously moving the surface to which the batch adheres to continuously present raw batch to the effective heat of the chamber, melting the batch and collecting it in a bath in said chamber.

2. The method of making glass which comprises continuously feeding glass-making batch into a tank and into adhesive contact with a melting surface at a point distant from the melting zone of the tank, continuously moving the melting surface to cause the batch to assume the form of a thin continuous sheet and to move it into the melting zone, melting the batch and directing it into a bath contained in the tank.

3. The method of making glass which comprises continuously feeding batch onto the surface of a revolving element located in the melting zone, revolving said element to move the batch from a zone of lower temperature to one of higher temperature, melting the batch in the last-named zone and delivering it from the revolving element into a bath maintained in the tank.

4. The method of melting glass which comprises maintaining a supply of the batch adjacent a moving element continuously moving the element to move a continuous sheet of glass batch into a melting zone, melting the batch to form glass and delivering the glass into a glass bath.

5. The method of making glass and controlling the rate thereof, which comprises feeding batch continuously into a melting chamber and upon a moving surface, continuously moving the surface and the batch thereon into a melting zone, melting the batch therein. varying the rate at which glass is so made by varying the rate of movement of the surface and the rate at which the batch is fed into the chamber.

6. In apparatus for making glass, a melting compartment, means for heating the compartment, means for delivering glass-making batch into said compartment, and moving means located within the compartment for receiving the unmelted batch and moving the same into the influence of the heat created by said heating means.

7. In apparatus for melting glass batch, a container, means for feeding glass batch into the said container, means for melting the batch in a melting zone within the container, and a rotating member for continuously conveying the glass batch into the melting zone within the container.

8. In glass-making apparatus, a melting compartment, means for heating the compartment, a rotary member within said compartment adapted to receive unmelted batch at a point in said compartment partially shielded from the action of the heating means and to convey it to another portion of the compartment not so shielded.

9. In apparatus for making glass, a melting chamber, means for heating the chamber, means for continuously feeding raw batch into the chamber, a rotating member located in the chamber adapted to receive the batch as fed into the chamber and to move the same to a position to subject the batch to direct action of the heating means.

10. In apparatus for melting glass batch, a container, means for melting glass batch in a melting zone within the container, and moving means for conveying the unmelted batch in a thin sheet into the melting zone.

11. In apparatus for melting glass batch, a container, means for feeding glass batch into the container, heating means within the container, means for conveying glass batch into the zone of influence of heating means, comprising a continuously rotating cylinder formed with outer sections of refractory materials.

12. In glass making apparatus, a heated chamber, and moving means within the chamber for conveying unmelted glass batch and presenting the same to the heat in the chamber.

13. In apparatus for melting glass batch, a container, and a rotating cylinder within the container, the cylinder having an outer surface made of refractory material upon which the batch is melted.

14. In apparatus for melting glass, a melting chamber, means for heating the chamber, a drum within said chamber having a surface of refractory material adapted to form a melting surface for glass batch, means for internally cooling the drum, means for feeding batch to the drum, and means for rotating the drum 15. In apparatus for melting glass, a melting chamber, means for heating the chamber, a drum within said chamber having a surface adapted to form a melting surface for glass batch, means for continuously supplying batch to the drum, means for continuously rotating the drum, and means for varying the rate of rotation of the drum.

16. In apparatus for melting glass, a melting chamber, means for heating the chamber, a drum within said chamber having a surface adapted to form a melting surface for glass batch, means for continuously supplying batch to the drum, means for continuously rotating the drum, and means for independently varying the rate of rotation of the drum and the rate at which the batch is supplied thereto.

17. In apparatus for melting glass batch, a container, a revolving member within the container, means for rotating the member and means for adjusting the relative position of the member within the container while the drum is being rotated.

Signed at Hartford, Connecticut, this 15th day of November, 1928.

HAROLD A. WADMAN.